United States Patent
Meggison et al.

(10) Patent No.: US 7,408,874 B2
(45) Date of Patent: *Aug. 5, 2008

(54) METHOD FOR MOVING NETWORK ELEMENTS WITH MINIMAL NETWORK OUTAGES IN AN ACTIVE ATM NETWORK

(75) Inventors: Earl C. Meggison, Lilburn, GA (US); Randy S. Young, Lilburn, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 38 days.

This patent is subject to a terminal disclaimer.

(21) Appl. No.: 11/567,148

(22) Filed: Dec. 5, 2006

(65) Prior Publication Data
US 2007/0242679 A1 Oct. 18, 2007

Related U.S. Application Data

(63) Continuation of application No. 10/179,272, filed on Jun. 26, 2002, now Pat. No. 7,145,865.

(51) Int. Cl.
*H04L 12/56* (2006.01)
(52) U.S. Cl. ........................ 370/216; 370/397
(58) Field of Classification Search .......... 370/216–228
See application file for complete search history.

(56) References Cited

U.S. PATENT DOCUMENTS

| | | | | |
|---|---|---|---|---|
| 5,796,736 A * | 8/1998 | Suzuki | ....................... | 370/254 |
| 6,028,861 A * | 2/2000 | Soirinsuo et al. | ............ | 370/225 |
| 6,067,286 A * | 5/2000 | Jones et al. | ................. | 370/218 |
| 6,229,787 B1 * | 5/2001 | Byrne | ........................ | 370/218 |
| 6,388,990 B1 * | 5/2002 | Wetzel | ....................... | 370/230 |
| 6,775,228 B1 * | 8/2004 | Solana De Quesada | ..... | 370/217 |
| 6,822,962 B1 * | 11/2004 | Noake et al. | ............. | 370/395.2 |
| 6,829,215 B2 * | 12/2004 | Tornar | ......................... | 370/223 |
| 6,873,628 B1 * | 3/2005 | Tang | ........................... | 370/480 |
| 6,959,334 B1 * | 10/2005 | Massengill | .................. | 709/223 |
| 6,990,068 B1 * | 1/2006 | Saleh et al. | ................. | 370/225 |
| 7,058,716 B1 * | 6/2006 | Sundaresan et al. | ......... | 709/225 |
| 7,170,854 B1 * | 1/2007 | Orrell et al. | ................. | 370/228 |
| 2003/0048746 A1 * | 3/2003 | Guess et al. | ................ | 370/219 |

* cited by examiner

*Primary Examiner*—Min Jung
(74) *Attorney, Agent, or Firm*—Withers & Keys, LLC

(57) ABSTRACT

A method for moving permanent virtual circuits in an ATM network with minimal downtime includes creating a list of the permanent virtual circuits to be moved; building a set of shadow permanent virtual circuits using the new ATM port and a temporary set of virtual path identifier and virtual circuit identifier pairs; moving a physical connection from the original ATM port to the new ATM port; deleting the permanent virtual circuits on the original ATM port; and changing the shadow permanent virtual circuits to use the original virtual path identifier and virtual circuit identifier pairs.

20 Claims, 5 Drawing Sheets

METHOD FOR MOVING NETWORK ELEMENTS WITH MINIMAL NETWORK OUTAGES IN AN ACTIVE ATM NETWORK

RELATED APPLICATIONS

The present application is a continuation of U.S. patent application Ser. No. 10/179,272, filed on Jun. 26, 2002, now U.S. Pat. No. 7,145,865 and entitled "Method for Moving Network Elements with Minimal Network Outages in an Active ATM Network," the disclosure of which is hereby incorporated herein, in its entirety, by reference.

BACKGROUND

1. Field of the Invention

The present invention relates generally to broadband network management, and more particularly to management of asynchronous transfer mode networks.

2. Background of the Invention

Traditionally, telecommunications service providers have offered basic services such as local and long distance exchange services for voice communications. More recently, with the explosive growth of the Internet and other data services, telecommunications service providers have expanded beyond basic telephone services to the provision of very high bandwidth network services. Examples of such newer network services include, for example, digital subscriber line (DSL), asymmetric digital subscriber line (ADSL), integrated services digital network (ISDN) digital subscriber line (IDSL), and the like. The underlying transmission facility supporting such high bandwidth networks may comprise an asynchronous transfer mode (ATM) network as shown in FIG. 1A.

ATM network or "cloud" 10 in FIG. 1A comprises one or more ATM switches 11-15. The switches may be interconnected in any suitable manner to provide redundancy in the network and to ensure high speed transmission of network packets. ATM switches are well-known in the art and are available from numerous switch vendors, including, for example, Lucent, Seimens and Northern Telecommunications. ATM switches typically comprise a processor, a memory and a backplane for supporting multiple network cards in a plurality of slots 16 as shown in FIG. 1B. A network card, for example, network card 17, typically comprises multiple ports 18 for supporting multiple communications paths. A distinct physical transmission cable, for example, a coaxial cable or fiber optic cable, may be connected to any given port on the network card. Each physical transmission cable carries thousands of logical circuits providing voice and data service.

Network service providers (NSP) 20-22 are provided connectivity to their end-users, subscribers 30, via ATM cloud 10 and central office DSLAM 40 via a permanent virtual circuit (PVC). The network traffic for each NSP is carried via a plurality of PVCs. A PVC is a connection that is established from a source end point to a destination end point without the ability of either end point to dynamically establish or release the connection. PVCs are manually implemented and must be manually released. A PVC is a "permanent" circuit because each PVC defines an end-to-end path for routing packets. However, the PVC is a "virtual" circuit because bandwidth from the cloud is utilized only when it is required. Each PVC is assigned a virtual path identifier (VPI) and a virtual connection identifier (VCI), which together identify the virtual circuit's end points, in accordance with well-known ATM standard specifications. Each ATM packet transmitted in ATM network 10 includes a VPI field and a VCI field in a packet's header. Within ATM network 10, the combination of VPI/VCI must be unique for each PVC at the network interface point (the source end and destination end of the PVC) to the ATM network, i.e., the physical network interface.

As described above, each ATM switch 11-15 supports multiple network cards, and each network card supports multiple physical connections. However, in conventional ATM networks, the lack of tools for adequately planning capacity changes in the network has proven to be a problem. For example, if every slot 16 on ATM switch 11 is configured with a network card supporting a eight ports (i.e., physical connections), and each port was configured with over one thousand PVCs, an unacceptable performance may result. One method for reducing such problems in conventional ATM networks has been to initially under-build the ATM network. That is, for example, an ATM switch having twelve slots may only be filled with ten cards, and each card may only have connections going into six of the eight available ports.

While an ATM network capacity manager may have anticipated such limitations when the network was designed, an accurate capacity plan may not be achievable without real-world network traffic being observed. This may be particularly true in situations where the demand for such high-bandwidth network services could not be adequately predicted. After an ATM network has been established, any changes to the physical card and port configuration require re-provisioning of every PVC affected. Accordingly, even moving one ATM physical connection from one switch to another may require re-provisioning of thousands of PVCs, which means hours and hours of service interruption.

Because each PVC must have a unique VPI/VCI at each network interface (it takes two network interfaces to create a destination and end point), the conventional method for re-provisioning a PVC required the following general steps:

1. select the new interface port;
2. unplug physical connection from old port and terminate to the new port; and
3. reassign, or relocate, the logical or virtual circuits to the new port.

This methodology is necessary due to the fact that the stationary end of the virtual circuit (the side not being relocated) cannot be manipulated due to the restriction of the unique VPI/VCI for the interface port.

The problem with implementing these steps in a conventional manner is that it may take several hours or even days to complete, resulting in unacceptable network downtime leading to customer service impairment. For example, an existing network may be configured as shown in the FIG. 2A. In this example, multiple PVCs are assigned on the DSLAM end to port two on the card in slot five (denoted "C5/P2") of ATM switch 200. The NSP end of these PVC's are assigned to port three of the card in slot eight (C8/P3), port four of the card in slot 6 (C6/P4), and port two of the card in slot 8 (C8/P2) on ATM switch 200. If the ATM network manager needs to move all of these PVCs terminated to the DSLAM through the circuit connected to C5/P2 208 to a different card, for example, to port four on the card in slot seven (C7/P4), the ATM manager must manually reassign each virtual circuit associated with 208 manually as follows:

1. As shown in FIG. 2B, each PVC must be manually relocated to the port C7/P4. For example, PVC 202 is originally assigned a connection between C5/P2 and C8/P3 202, as shown in FIG. 2A. At this point, the new PVC, PVC 204 is an inactive PVC that will not carry traffic on the ATM network. Since the DSLAM 206 has not been connected to the new circuit 209, the PVC is inactive and will not be available to the end-users. This step typically takes about three minutes to perform for each PVC. Accordingly, if there are one thousand affected PVCs, the total downtime for this step alone will be fifty hours.

2. As shown in FIG. 2C, after the PVCs have been terminated to the new physical connection, circuit connection 209 is created by unplugging 208 from the old port. In other words, connection 208 is replaced by connection 209; and 3. As shown in FIG. 2D, the final step in the process is to restore service to each PVC after the physical circuit has been reconnected. At this point in the process, PVC 204 is active and available to NSP 20.

Step 2 is repeated for each PVC that has been moved. Again, this step requires about three minutes per PVC, resulting in a total downtime of fifty hours for this step and creating the unacceptable service condition requiring a different business process to complete the task.

As the above example illustrates, the conventional methods for moving network elements connected to an ATM cloud results in significant downtime for ATM network customers. A need therefore exists for a method of moving network elements with minimal network downtime for end-users associated with an ATM network.

SUMMARY OF THE INVENTION

The present invention provides a method for moving a plurality of permanent virtual circuits in an ATM network from a first ATM port to a second ATM port. The method comprises: creating a list comprising the plurality of permanent virtual circuits to be moved, wherein the list comprises a first plurality of virtual path identifier and virtual circuit identifier pairs; building a plurality of shadow permanent virtual circuits, wherein the plurality of shadow permanent virtual circuits use the second ATM port, and wherein the plurality of shadow permanent virtual circuits comprise a second plurality of virtual path identifier and virtual circuit identifier pairs; moving a physical connection from the first ATM port to the second ATM port; deleting the plurality of permanent virtual circuits on the first ATM port; and changing the plurality of shadow permanent virtual circuits to use the first plurality of virtual path identifier and virtual circuit identifier pairs.

The VPI/VCI restriction is on the end of the PVC circuit that is not relocated. The restriction is unique to the stationary interface. The VPI/VCI assignments on the relocated side of the PVC remain the same, as the interface will move from Card 5 Port 2 to Card 7 Port 4 as described in FIG. 2D. Thus, in accordance with the invention, coordination with the NSP may sometimes be necessary since it "owns" the stationary interface and as such will need to allow the assignment of a Shadow VPI/VCI to be utilized for the duration of the relocation.

Thus, in other words, the invention creates a shadow PVC between a stable or non-changing interface, and a changing interface. The shadow PVC is preferably made active as soon as the changing interface is moved from Card 5 Port 2 to Card 7 Port 4 as described in FIG. 2D. Therefore, the shadow VPI/CI at the stationary interface is a key element to make this process successful.

DETAILED DESCRIPTION OF THE INVENTION

Figure 1A:
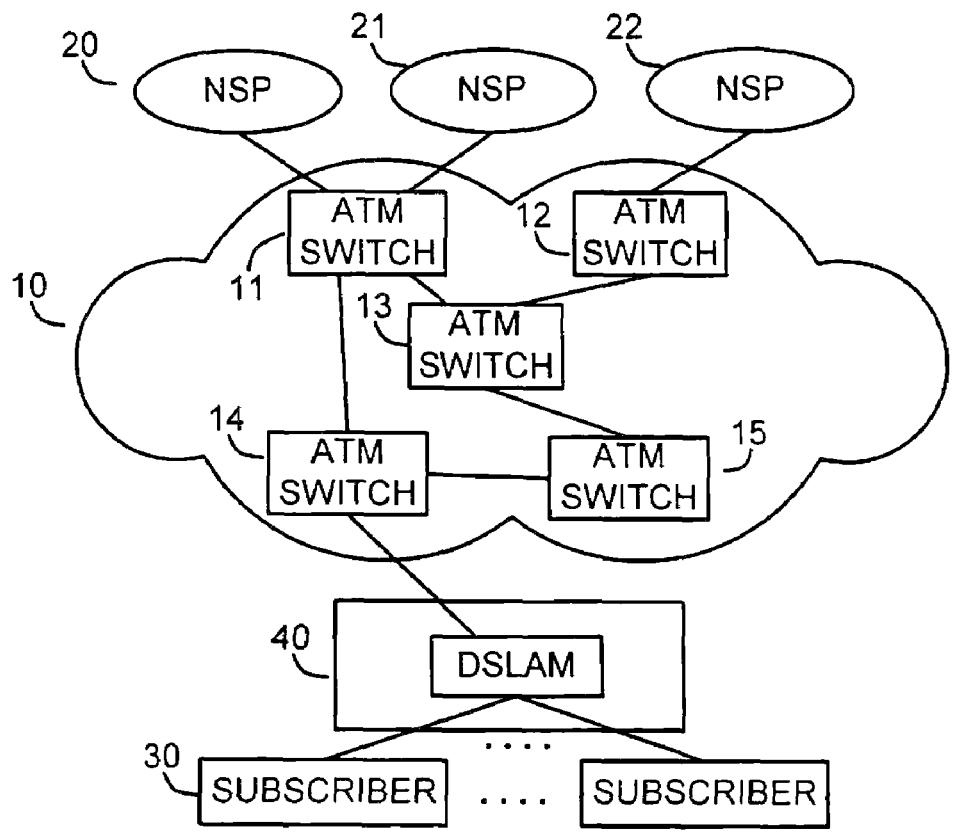
FIG. 1A is a schematic diagram illustrating an ATM network architecture.
Figure 1B:
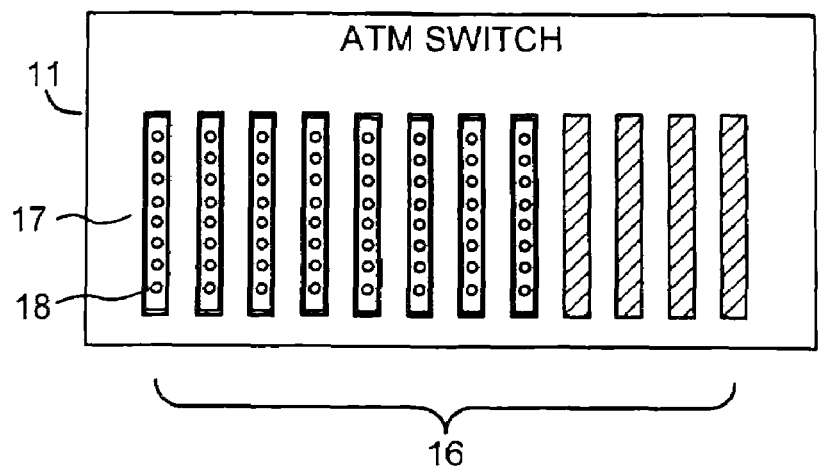
FIG. 1B is a schematic diagram illustrating the backplane of a typical ATM switch.
Figure 2A:
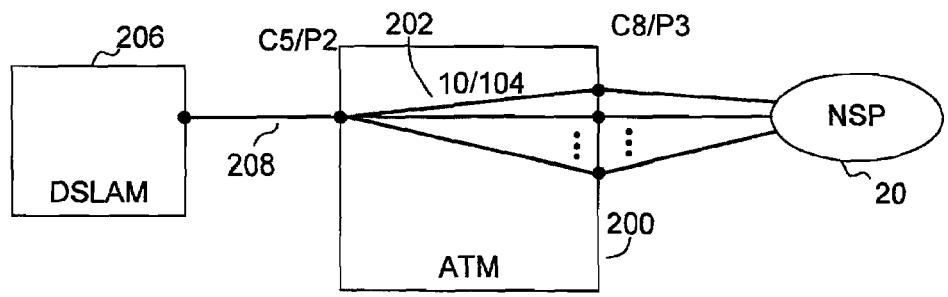
FIGS. 2A-2D are schematic diagrams illustrating a conventional process for moving network elements in an active ATM network.
Figure 2B:
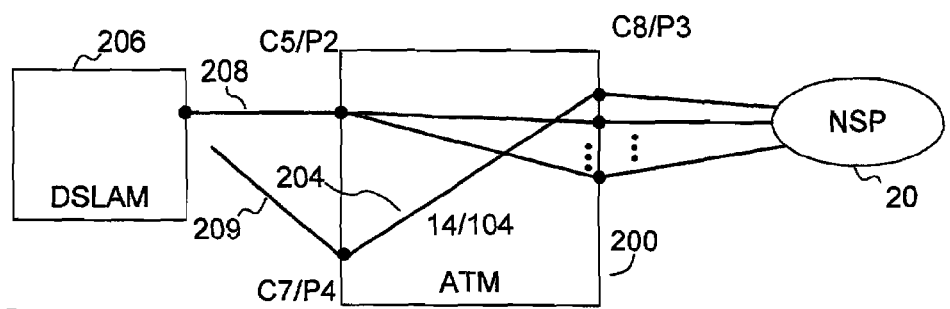
Figure 2C:
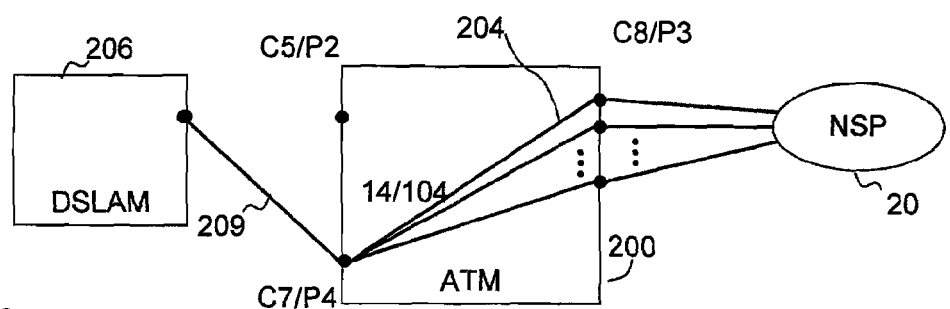
Figure 2D:
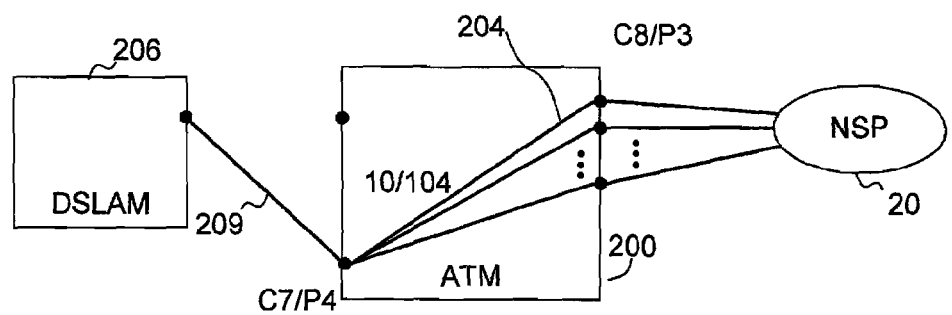
Figure 3:
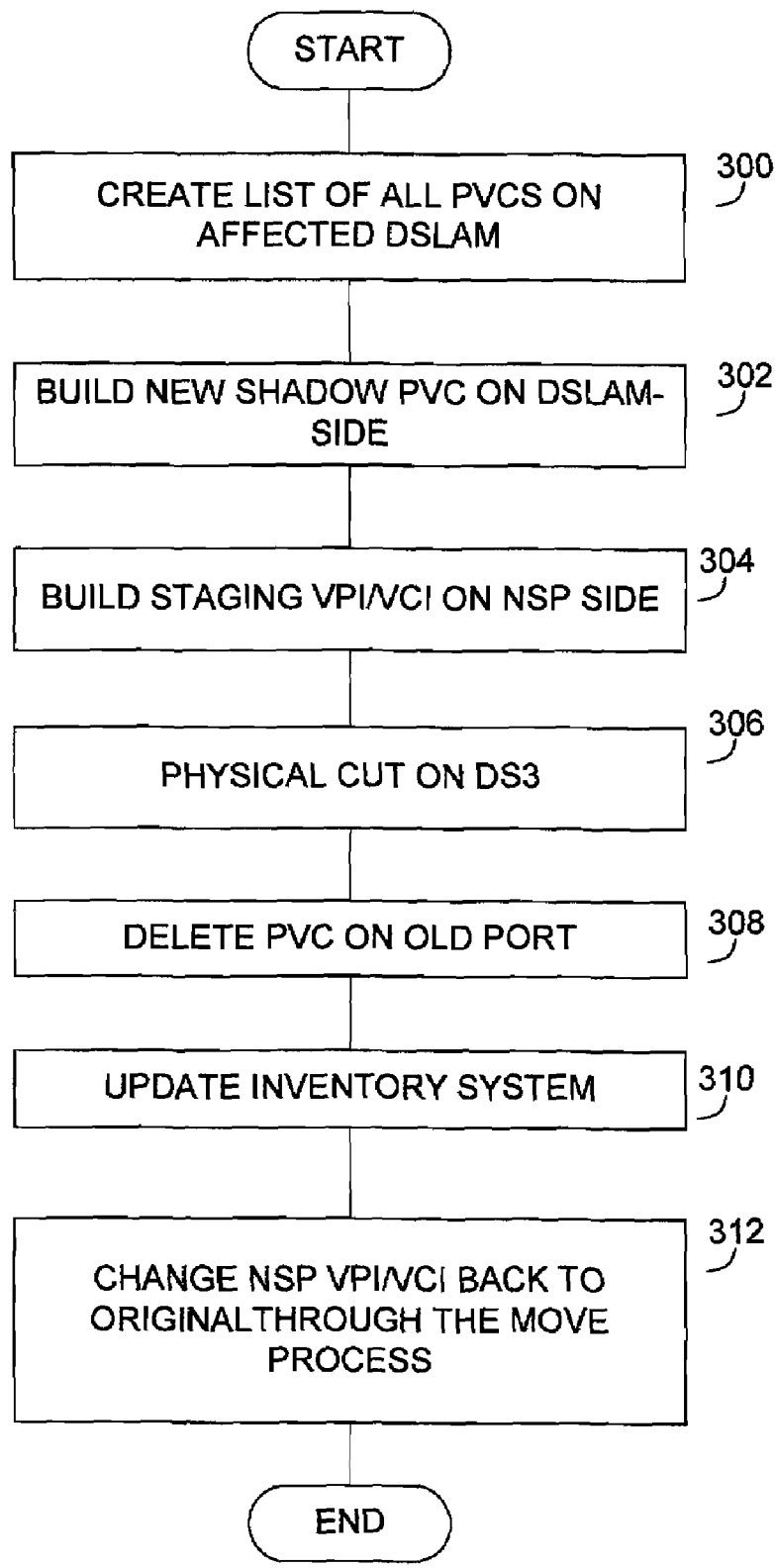
FIG. 3 is a flow diagram of steps that may be performed to move network elements in an active ATM network according to an embodiment of the present invention.

The present invention provides a method for re-provisioning circuits on a digital subscriber line access multiplexer (DSLAM) in an active asynchronous transfer mode (ATM) network with minimal service outages for the subscribers being served via the affected circuits. The flow diagram shown in FIG. 3 shows exemplary steps that may be carried out to move ATM network elements in an embodiment of the present invention. FIGS. 4A through 4D are schematic diagrams showing how these steps may be implemented in an active ATM network.

Figure 4A:
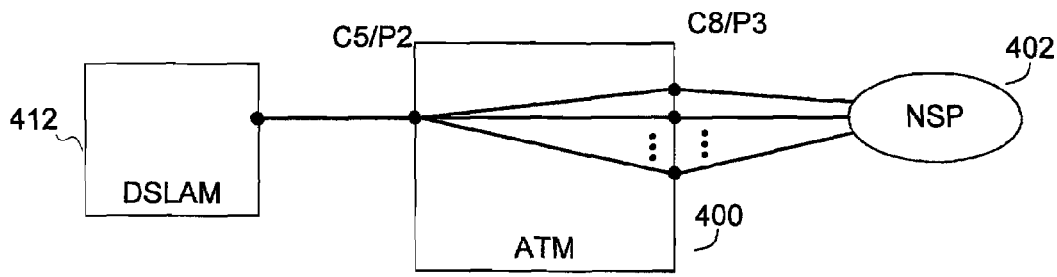
FIGS. 4A-4D are schematic diagrams illustrating a process to move network elements in an active ATM network according to an embodiment of the present invention.
Figure 4B:
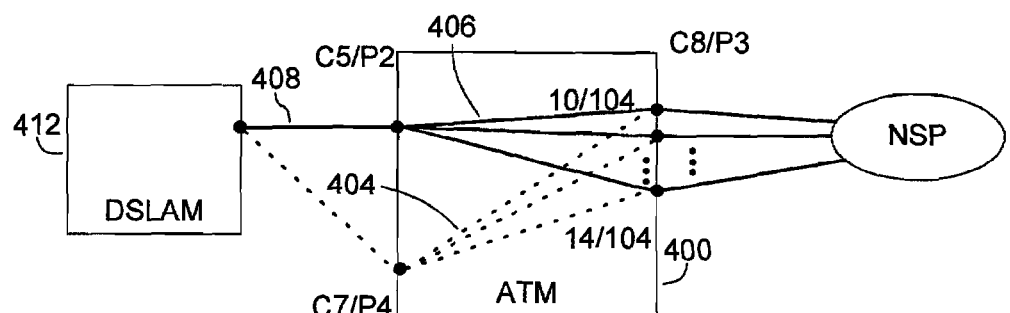

In step 300 a list of all permanent virtual circuits on the affected port and card is compiled. Referring the FIG. 4A, if the ATM network manager needs to move traffic from card five port two of ATM switch 400 to card seven port four, the list would include the VPI/VCI for each PVC affected. The list compiled in step 300 is used to build a set of "shadow" PVCs in step 302. The VPI/VCIs assigned to the new shadow PVCs are preferably determined after coordination with NSP 402. Typically, establishing shadow PVCs is accomplished with NSP coordination. In step 304, shadow VPI/VCIs are built on the NSP side of ATM switch 400. Steps 302 and 304 are illustrated in FIG. 4B. In that figure, shadow PVC 404, corresponding to existing PVC 406, is created with a VPI/VCI of 14/104. As shown in FIG. 4B, existing PVC 406 is still operational at this point in the process. Shadow PVCs are built for each PVC affected by the move.

Figure 4C:
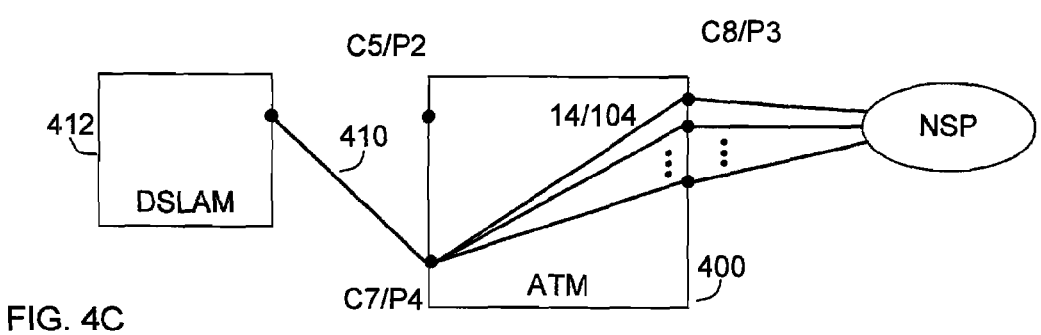
Figure 4D:
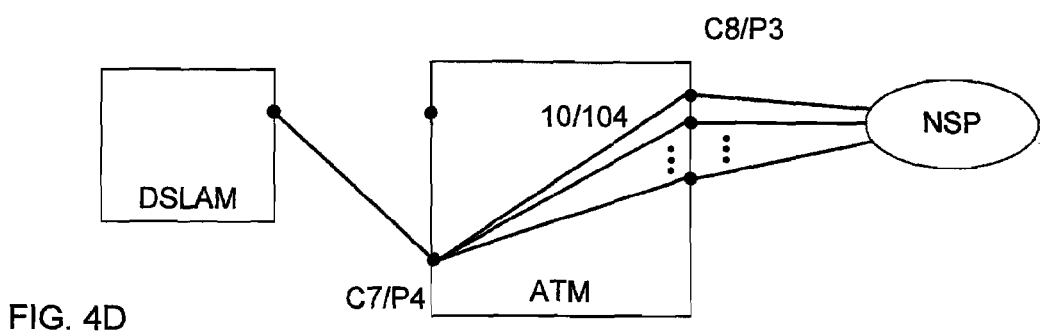

After all of the needed shadow PVCs have been provisioned, physical line 408 (such as a DS3) is removed in step 306 and, as shown in FIG. 4C, physical line 410 is connected between DSLAM 412 and ATM switch 400. It is noted that physical line 408 could be the same as physical line 410 such that when line 408 is unplugged from card five port two, it may be plugged into card seven port four to become physical line 410. Alternatively, a new line may be used to complete the connection between DSLAM 412 and ATM switch 400. In step 308, the former PVCs are deleted on the port to be replaced, (i.e., card five, port two).

In step 310, an inventory system is updated to reflect the new connection path for the DSLAM. In step 312, the shadow PVCs are made permanent. This step involves approximately two minutes of downtime for each PVC, but the down time is not cumulative. That is, each PVC is only down for the amount of time needed to change the temporary VPI/VCI back to original on the NSP-side of ATM switch 400. Thus, according to the present invention, a maximum network downtime for any given PVC will be under approximately seventeen minutes, namely, about 15 minutes for step 310 and about two minutes for step 312.

Figure 5A:
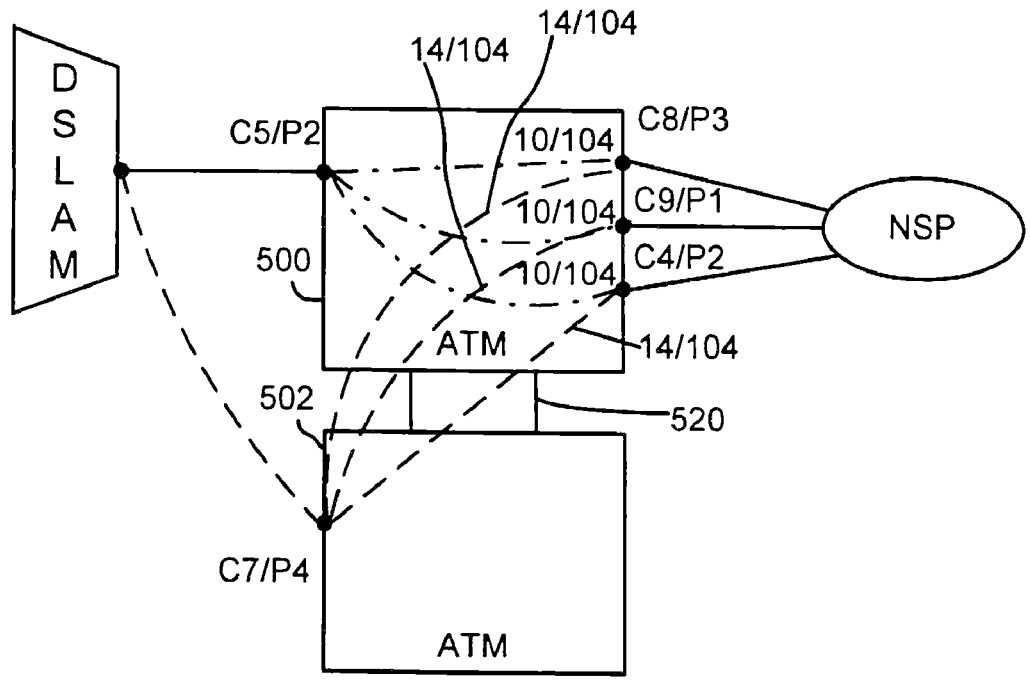
FIGS. 5A and 5B are schematic diagrams illustrating a process to move network elements in an active ATM network according to an embodiment of the present invention.
Figure 5B:
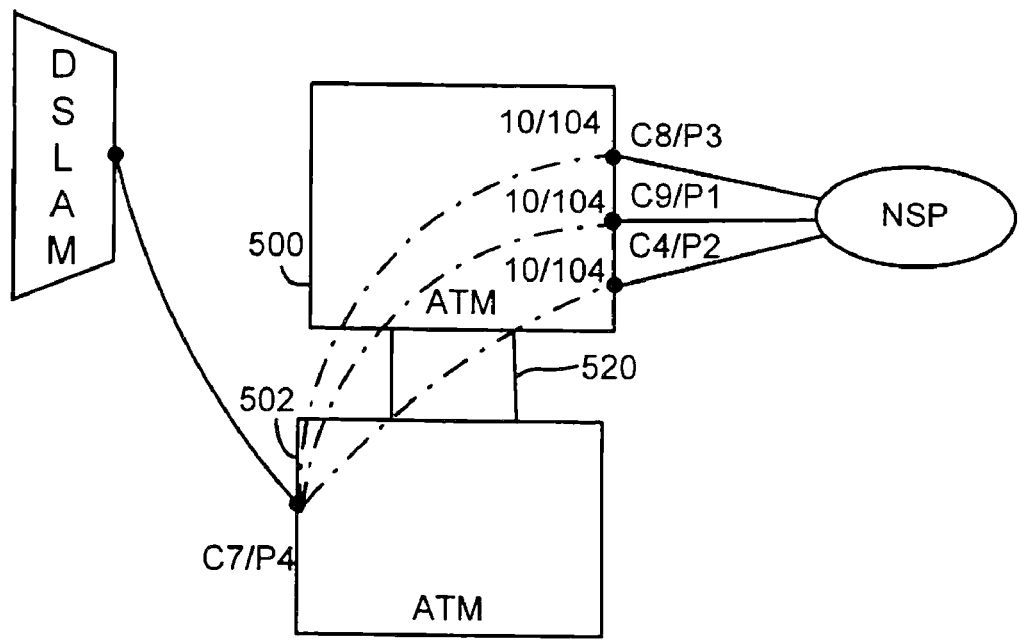

The present invention is not limited to operations with a single ATM switch. For example, FIGS. 5A and 5B show how the present invention may be used to move network elements from one ATM switch to another ATM switch. In FIGS. 5A and 5B, all PVCs on card five port two of ATM switch 500 are moved to card seven port four of ATM switch 502 according to the present invention. More specifically, as shown in FIG. 5A, a particular VPI/VCI is unique to each interface the NSP is connected to. Thus, as shown, the NSP is connected to VPI/VCI 14/104, but utilizing several different cards and ports. To reconfigure the connection, shadow PVCs are established defined by VPI/VCI pair 14/104. These shadow PVCs traverse inter-switch trunks 520 to pass between switches (e.g., 500 to 502). Once the DSLAM connection is made to card seven port four (C7/P4), the original connection to C5/P2 is taken down. Thus, as described above with respect to moving connection within a single ATM switch, it is also possible to reconfigure connections among different switches with minimal downtime for each individual PVC.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for moving a plurality of permanent virtual circuits in an ATM network from a first ATM port to a second ATM port, said method comprising:
   creating a list comprising the plurality of permanent virtual circuits to be moved, wherein the list comprises a first plurality of virtual path identifier and virtual circuit identifier pairs;
   building a plurality of shadow permanent virtual circuits, wherein the plurality of shadow permanent virtual circuits use the second ATM port, and wherein the plurality of shadow permanent virtual circuits comprise a second plurality of virtual path identifier and virtual circuit identifier pairs;
   moving a physical connection from the first ATM port to the second ATM port;
   deleting the plurality of permanent virtual circuits on the first ATM port; and
   changing the plurality of shadow permanent virtual circuits to use the first plurality of virtual path identifier and virtual circuit identifier pairs.

2. The method of claim 1, wherein the first ATM port and the second ATM port are on the same ATM switch.

3. The method of claim 1, wherein the first ATM port and the second ATM port are on different ATM switches.

4. The method of claim 1, wherein a maximum network downtime for transferring the plurality of permanent virtual circuits is less than about 17 minutes.

5. The method of claim 1, further comprising coordinating with a network service provider to identify the second plurality of virtual path identifier and virtual circuit identifier pairs.

6. The method of claim 1, further comprising using the same physical line while moving a physical connection from the first ATM port to the second ATM port.

7. The method of claim 1, further comprising updating an ATM network inventory system to reflect a new connection path to the second ATM port.

8. A method for moving a plurality of permanent virtual circuits in an ATM network from a first ATM port to a second ATM port, said method comprising:
   building a plurality of shadow permanent virtual circuits, wherein the plurality of shadow permanent virtual circuits use the second ATM port, and wherein the plurality of shadow permanent virtual circuits comprise a second plurality of virtual path identifier and virtual circuit identifier pairs;
   moving a physical connection from the first ATM port to the second ATM port;
   deleting the plurality of permanent virtual circuits on the first ATM port;
   changing the plurality of shadow permanent virtual circuits to use the first plurality of virtual path identifier and virtual circuit identifier pairs; and updating an inventory system to reflect a new connection path.

9. The method of claim 8, further comprising creating a list comprising the plurality of permanent virtual circuits to be moved, wherein the list comprises a first plurality of virtual path identifier and virtual circuit identifier pairs.

10. The method of claim 8, wherein the first ATM port and the second ATM port are on the same ATM switch.

11. The method of claim 8, wherein the first ATM port and the second ATM port are on different ATM switches.

12. The method of claim 8, wherein a maximum network downtime for transferring the plurality of permanent virtual circuits is less than about 17 minutes.

13. The method of claim 8, further comprising coordinating with a network service provider to identify the second plurality of virtual path identifier and virtual circuit identifier pairs.

14. The method of claim 8, further comprising using the same physical line while moving a physical connection from the first ATM port to the second ATM port.

15. A method of moving a digital subscriber line multiplexer (DSLAM) connection to an ATM switch from a first position to a second position, the method comprising:
   establishing a plurality of shadow permanent virtual circuits that connect the second position to terminating points of the first position;
   connecting the DSLAM to the second position; and
   updating an inventory system to reflect the new connection between the terminating points of the first position and the second position.

16. The method of claim 15, wherein the first and second positions comprise ports on at least one ATM switch card.

17. The method of claim 15, wherein the inventory system stores information about permanent virtual circuits.

18. The method of claim 15, wherein a maximum network downtime for moving the DSLAM connection is less than about 17 minutes.

19. The method of claim 15, further comprising coordinating with a network service provider to identify permanent virtual circuits.

20. The method of claim 15, further comprising using the same physical line to move the DSLAM connection.

* * * * *